… …

United States Patent Office 3,437,899
Patented Apr. 8, 1969

3,437,899
POWER SOURCE DEVICE FOR DRIVING STEP MOTOR OF GYRO
Yoichi Hirokawa, Musashino-shi, Tokyo, Japan, assignor to Kabushikikaisha Tokyo Keiki Seizosho (Tokyo Keiki Seizosho Co., Ltd.), Tokyo, Japan, a corporation of Japan
Filed Aug. 4, 1966, Ser. No. 570,296
Int. Cl. H02k 29/00
U.S. Cl. 318—138                 4 Claims This invention relates to a power source device for driving a step motor of a gyro and more particularly to a power source device for driving a step motor of a gyro which is adapted to drive the step motor through a rectifier circuit by a power source for a gyro drive motor and which is simple in construction and reliable in operation.

In the prior art the step motor is driven through a rectifier circuit consisting of, for example, semiconductor control rectifiers (hereinafter referred to as SCRs) by a direct current containing ripples which is produced through rectification of a commercial power source having a frequency of 50 c./s. or 60 c./s.

It is the matter of course that the operation of the step motor of the gyro be accomplished with extremely high precision and accuracy so as to avoid errors. However, the step motor does not work in a satisfactory manner when subjected to mechanical noise, although the movement of, for example, a ship is so quiet that the step motor is not adversely affected to produce vibration due to such mechanical noise. In the case where the step motor is driven by an AC power source of 50 c./s. through a rectifier circuit as described above, a DC voltage containing ripples of a relatively low frequency such as 100 c./s. is applied to the step motor through SCRs connected thereto and, as a result, mechanical vibration due to this frequency is produced in the iron core forming the step motor. This mechanical vibration generates noise which disturbs the normal operation of the step motor.

Further, it has been found to be undesirable for rapid and accurate operation of the step motor that SCRs constituting a controller perform commutation at a frequency of approximately 100 c./s. as will be described later on.

Accordingly, it is one object of this invention to provide a power source device for driving a step motor of a gyro with which the step motor can be driven speedily and accurately.

It is another object of this invention to provide a power source device for driving a step motor of a gyro with which the step motor can be effectively and accurately driven without causing mechanical vibration noise which is harmful to the step motor.

It is still another object of this invention to provide a power source device for driving a step motor of a gyro with which the step motor is driven through SCRs by the use of an inverter circuit which serves as a power source for a gyro drive motor and produces an alternating current of 400 c./s.

Other objects, features and advantages of this invention will become apparent from the following description taken in conjunction with the accompanying drawings, in which.

Figure 1:
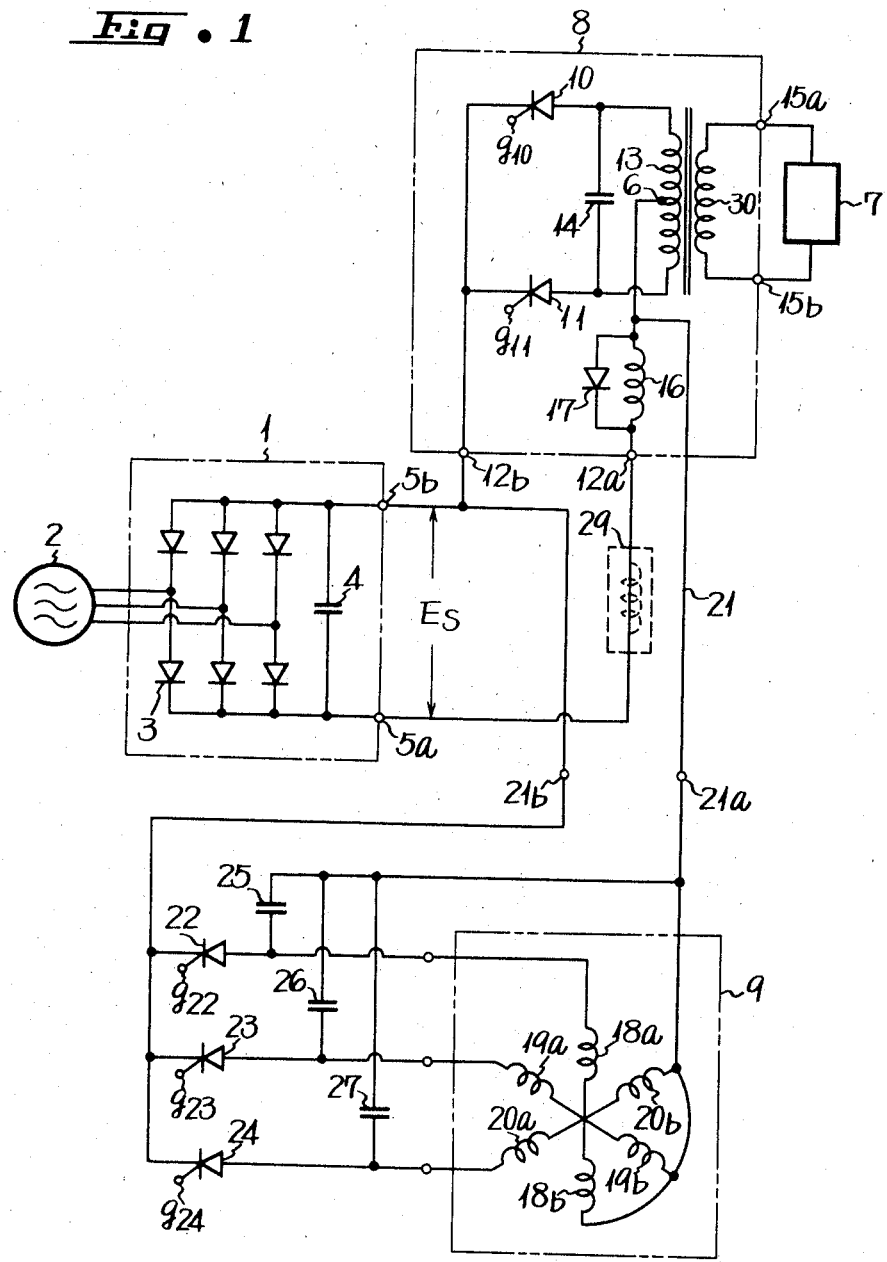
FIGURE 1 is a connection diagram illustrating one example of a power source device for driving a step motor of gyros.

Referring to FIGURE 1, reference numeral 1 indicates a DC power source, which is designed such that the output of, for example, a three-phase AC power source 2 is subjected to full-wave rectification by six rectifiers 3 and the rectified outputs are applied to both ends of a capacitor 4. Led out from the both ends of the capacitor 4 are DC positive and negative terminals 5a and 5b. Reference numeral 7 indentifies a gyro drive motor as an AC load.

In the illustrated example the A Cload 7 is connected to the DC power source 1 through an inverter 8 consisting of SCRs, and a step motor 9 for a gyro is connected to the DC power source 1, which step motor is a DC load controlled by SCRs through a commutation impedance element of the inverter 8.

The inverter 8 is of, for example, the parallel connected type and is provided with two SCRs 10 and 11. The cathodes of these SCRs 10 and 11 are interconnected, a negative input terminal 12b being connected thereto, and their anodes are connected to each end of a parallel circuit of a coil 13 and a commutation capacitor 14. A coil 30 is provided which is electromagnetically coupled with the coil 13 and output terminals 15a and 15b are connected both ends of the coil 30. A positive input terminal 12a is connected to the middle point 6 of the coil 13 through a parallel circuit of a commutation coil 16 and a diode 17. The positive and negative input terminals 12a and 12b of such an inverter 8 are connected respectively to the positive and negative terminals 5a and 5b of the DC power source 1. While, the output terminals 15a and 15b are connected to both ends of the gyro drive motor 7. The step motor 9 comprises three pairs of windings 18a and 18b, 19a and 19b, 20a and 20b connected in series with each other, each one end of these series-connected windings being connected to the one input terminal 21a and the other ends being connected to the other terminal 21b through SCRs 22, 23 and 24 respectively. The terminal 21a is in turn connected to the positive terminal 5a of the DC power source 1 through the commutation coil 16 of the inverter 8, while the terminal 21b is connected to the negative terminal 5b of the power source 1. Further, if necessary, commutation capacitors are connected in parallel to the step motor 9 so as to ensure commutation. In the illustrated example, connecting points between the windings 18a, 19a, 20a and the SCRs 22, 23, 24 are connected to the terminal 21a through the commutation capacitors 25, 26 and 27 respectively. To gates $g_{22}$, $g_{23}$ and $g_{24}$ of the SCRs 22, 23 and 24 are fed step-motor control signals from the gyro. Meanwhile, control signals of 400 c./s. are applied to gates $g_{10}$ and $g_{11}$ of the SCRs 10 and 11 from the gyro drive power source.

Figure 2:
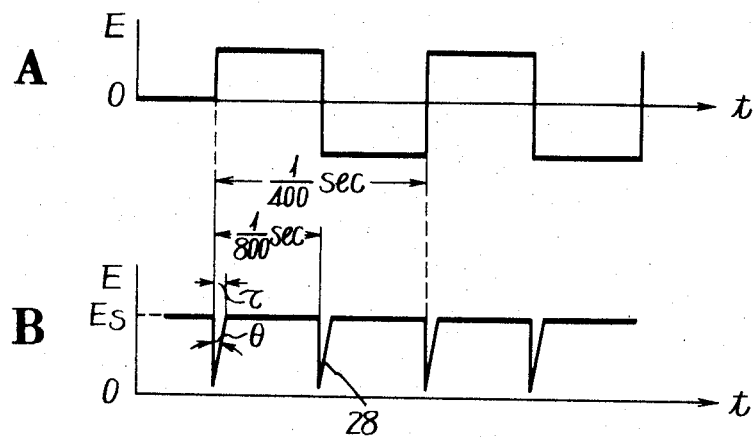
FIGURES 2A and 2B are waveform diagrams for explaining the operation of the device shown in FIGURE 1.

With the arrangement described above, control signals of 400 c./s. phased 180 degrees apart are applied to the control grids $g_{10}$ and $g_{11}$ of the SCRs 10 and 11 of the inverter 8 so that the SCRs 10 and 11 are conducted alternately to thereby convert a DC power into an AC power, and then the converted power is fed to the gyro drive motor 7. In this case, during the commutation period of the SCRs 10 and 11 the input impedance between the middle point 6 of the coil 13 and the terminal 12b is remarkably reduced due to the particular mechanism of the parallel-connected type inverter. Therefore, during the commutation period the voltage $E_s$ between the terminals 5a and 5b of the DC power source 1 is mostly applied to the commutation coil 16 interposed between the middle point 6 and the terminal 5a, and the voltage between the middle point 6 and the terminal 5b approaches zero. As a result of this, the voltage between the middle point 6 and the terminal 5b, which is substantially the same as the voltage $E_s$ of the power source in the steady state, approaches zero at every commutation by the SCRs 10 and 11. Namely, as illustrated in FIGURE 2B, a negative pulse 28 is produced at every half cycle of the control signal of the SCRs 10 and 11, the duration of which pulse is equal to the time necessary for the commutation. While such a voltage between the middle point 6 and the terminal 5b is being fed between the terminals 21a and 21b, a step motor control signal is applied to the control grid of the SCR 22 from the gyro to thereby conduct it. Upon conducting the SCR 22, the conducting current flows through the windings 18a and 18b and the step motor 9 is thereby rotated by one step. After this, the aforementioned negative pulse 28 produced between the middle point 6 and the terminal 5b causes a decrease in the voltage between the terminals 21a and 21b, which results in cutting off the SCR 22. In this case, the capacitor 25 discharges electric charges stored therein during the conduction of the SCR 22, so that the SCR 22 can be made inoperative more accurately. Also in the excitation of the windings 19a and 19b or 20a or 20b by conducting the SCR 23 or 24, the SCR 23 or 24 are automatically cut off by the negative pulse 28 produced between the middle point 6 and the terminal 5b. Thus, sequential feeding of the control pulses to the SCR 22, 23 and 24, leads to sequential excitation of the windings 18a and 18b, 19a and 19b, 20a and 20b, so that the step motor can be driven step by step.

Figure 3:
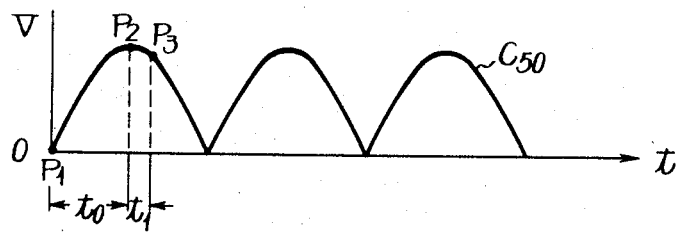
FIGURE 3 is a waveform diagram for explaining the operation of a conventional power source device for driving a step motor of gyros.

A discussion will be made in connection with the driving of the step motor by a DC voltage containing ripples obtained through rectification of a current of 50 c./s. as described previously. The waveform of the ripples contained in the DC voltage is as indicated by a curve $C_{50}$ in FIGURE 3. If now a gate control signal is applied to the SCR 23 when the SCR 22 is conductive with its gate control signal having reduced to zero, the SCR 22 does not become nonconductive during a time $t_0$ from $P_1$ to $P_2$ because the voltage impressed thereto still rises, as depicted in FIGURE 3. The impressed voltage begins to go down between $P_2$ and $P_3$ but its slope is gentle, so that even if the gate control signal is applied to the SCR 23, the SCR 22 is not turned "off" for a period of time from $P_1$ to $P_3$ $(t_0+t_1)$. Accordingly, the SCRs 22 and 23 are held conductive together, and hence the step motor does not operate in response to the gate control pulse. That is, the switching operation of the SCRs cannot be accomplished at a desired rotating speed of the step motor. In other words, the response speed of the step motor is delayed through the use of the conventional power source device of the type utilizing a commercial power source of 50 c./s. and applying to the SCRs a rippled DC of 100 c./s. such as shown in FIGURE 3.

To avoid this, in the present invention the circuit connection is designed in such a manner as to utilize the variations in the input impedance of the inverter 8, namely the impedance between the terminal 5b and the middle point 6.

That is, the one end of the commutation coil 16 of the inverter 8 opposite from the connecting terminal 12a of the plus side of the DC power source 1 and consequently the middle point 6 is connected through a line 21 to the one terminal 21a of the step motor windings. With such a connection, a pulse is produced as identified by 28 in FIGURE 2B at a time when the both SCRs 10 and 11 of the inverter 8 are conductive, namely the voltage impressed to the SCR 22, 23 or 24 abruptly approaches zero at this moment. The pulse 28 is produced every 1/800 sec. and its width $\tau$ is on the order of microsecond, so that the pulse 28 is very sharp to ensure rapid and accurate turn-off of the SCRs 22, 23 and 24. This results in accurate and high-speed operation of the step motor and the iron core of the step motor does not ever vibrate with a frequency of 800 c./s., and hence no noise is produced. Further, it is possible to accurately switch on and off the SCRs 22, 23 and 24 for controlling the power to be applied to the DC load 9 without any complicated device. Therefore, in either case where no or a small amount of ripple is contained in a DC power source, the direct current to be applied to the DC load from the power source can be controlled by the SCRs without losing the features of the SCR such as light weight, small size and capability of controlling a high power.

In the foregoing the voltage $E_s$ of the DC power source 1 is mostly fed to the commutation coil 16 at the time of commutation by the SCRs 10 and 11 of the inverter 8, but it is also possible to impress the DC power source voltage $E_s$ to an impedance element 29 inserted between the terminals 12a and 5a or 12b and 5b. In such a case, the terminal 21b is connected to the terminal 12a or the terminal 21b is connected to the terminal 12b. Meanwhile, it is usually preferred to employ an inductance element so as to reduce DC power dissipation.

It will be apparent that many modifications and variations may be effected without departing from the scope of the novel concepts of this invention.

What I claim is:

1. A power source device for driving a step motor of a gyro comprising a DC power source, an inverter connected thereto and converting the power source voltage into an AC voltage, the inverter consisting of a plurality of control rectifier elements, a converting coil connected between the anodes of the control rectifier elements and an impedance connected between the middle point of the converting coil and the plus side of the DC power source, a gyro drive motor actuated by one portion of the output current of the inverter, a step motor for the gyro actuated by the other portion of the current from the inverter, a control circuit connected to the inverter and consisting of control rectifier elements for sequentially applying the DC current including pulses from the inverter to the windings of the step motor, means for connecting the terminal of the impedance opposite from the plus side of the DC power source to the one terminal of the windings of the step motor for the gyro, and means for connecting the minus side of the DC power source to the minus side of the second-mentioned control rectifier elements.

2. A power source device for driving a step motor of a gyro comprising a DC power source, an inverter connected thereto and converting the power source voltage into an AC voltage, the inverter consisting of two semiconductor control rectifier elements, a capacitor and a converting coil respectively connected between the anodes of the control rectifier elements and an inductance coil connected between the middle point of the converting coil and the plus side of the DC power source, a drive motor for the gyro actuated by one portion of the output current of the inverter, a step motor for the gyro actuated by the other portion of the current from the inverter, a control circuit connected to the inverter and consisting of three semiconductor control rectifier elements for sequentially applying the DC current including pulses from the inverter to the windings of the step motor, means for connecting the terminal of the inductance coil opposite from the plus side of the DC power source to the one terminal of the windings of the step motor for the gyro, and means for connecting the minus side of the DC power source to the minus side of the second-mentioned semiconductor control rectifier elements.

3. A power source device for driving a step motor of a gyro comprising a DC power source, an inverter connected thereto and converting the power source voltage into an AC voltage, the inverter consisting of two control rectifier elements, a capacitor and a converting coil respectively connected between the anodes of the control rectifier elements and inductance coil connected between the middle point of the converting coil and the plus side of the DC power source, a gyro drive motor actuated by one portion of the output current of the inverter, a step motor for the gyro actuated by the other portion of the current from the inverter, a control circuit connected to the inverter and consisting of three control rectifier elements for sequentially applying the DC current including pulses from the inverter to the windings of the step motor, means for connecting the terminal of the inductance coil of the inverter opposite from the plus side of the DC power source to the one terminal of the windings of the step motor for the gyro, and means for connecting the minus side of the DC power source to the minus side of the second-mentioned control rectifier elements, the windings of the step motor being connected to the plus side of the second-mentioned control rectifier elements, a control signal of 400 c./s. being applied to the gate electrodes of the first-mentioned two control rectifier elements, and a step motor control signal being applied to the gate electrodes of the second-mentioned three control rectifier elements.

4. A power source device for driving a step motor of a gyro comprising a DC power source, an inverter connected thereto and converting the power source voltage into an AC voltage, the inverter consisting of two semiconductor control rectifier elements, a capacitor and a converting coil respectively connected between the anodes of the semiconductor control rectifier elements and an inductance coil connected between the middle point of the converting coil and the plus side of the DC power source, a gyro drive motor actuated by one portion of the output current of the inverter, a step motor for the gyro actuated by the other portion of the current from the inverter, a control circuit connected to the inverter and consisting of three semiconductor control rectifier elements for sequentially applying the DC current including pulses from the inverter to the windings of the step motor, means for connecting the terminal of the inductance coil opposite from the plus side of the DC power source to the one terminal of the windings of the step motor for the gyro, and means for connecting the minus side of the DC power source to the minus side of the second-mentioned semiconductor control rectifier elements, the windings of the step motor being connected to the plus side of the second-mentioned semiconductor control rectifier elements, a control signal of 400 c./s. being applied to the gate electrodes of the first-mentioned two semiconductor control rectifier elements, and a step motor control signal being applied to the gate electrodes of the second-mentioned three semiconductor control rectifier elements.

References Cited

UNITED STATES PATENTS

| | | | |
|---|---|---|---|
| 3,109,976 | 11/1963 | Sichling | 321—4 |
| 3,273,041 | 9/1966 | Strohmeier | 321—4 |
| 3,355,646 | 11/1968 | Goto | 318—138 |

ORIS L. RADER, *Primary Examiner.*

G. SIMMONS, *Assistant Examiner.*

U.S. Cl. X.R.

318—107; 321—4